United States Patent
Lee et al.

(10) Patent No.: US 11,928,797 B2
(45) Date of Patent: Mar. 12, 2024

(54) ELECTRONIC DEVICE AND METHOD FOR ACQUIRING A SYNTHESIZED IMAGE

(71) Applicant: Samsung Electronics Co., Ltd., Suwon-si (KR)

(72) Inventors: Taehee Lee, Suwon-si (KR); Jihye Kim, Suwon-si (KR); Sahng-Gyu Park, Suwon-si (KR); Seunghoon Han, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 252 days.

(21) Appl. No.: 17/278,471

(22) PCT Filed: Oct. 11, 2019

(86) PCT No.: PCT/KR2019/013354
§ 371 (c)(1),
(2) Date: Mar. 22, 2021

(87) PCT Pub. No.: WO2020/085696
PCT Pub. Date: Apr. 30, 2020

(65) Prior Publication Data
US 2022/0036522 A1 Feb. 3, 2022

(30) Foreign Application Priority Data

Oct. 24, 2018 (KR) ........................ 10-2018-0127399

(51) Int. Cl.
*G06T 5/00* (2006.01)
*G06T 5/40* (2006.01)
*G06T 7/13* (2017.01)

(52) U.S. Cl.
CPC ................ *G06T 5/009* (2013.01); *G06T 5/40* (2013.01); *G06T 7/13* (2017.01);
(Continued)

(58) Field of Classification Search
CPC . G06T 5/009; G06T 7/13; G06T 2207/20208; G06T 2207/20221
See application file for complete search history.

(56) References Cited

U.S. PATENT DOCUMENTS 7,495,699 B2 2/2009 Nayar et al.
7,983,500 B2 7/2011 Zeng et al.
(Continued)

FOREIGN PATENT DOCUMENTS

CN 102457669 A 5/2012
CN 103312973 A 9/2013
(Continued)

OTHER PUBLICATIONS

Dastanova, Nazgul, et al. "Bit-plane extracted moving-object detection using memristive crossbar-cam arrays for edge computing image devices." IEEE Access 6 (2018): 18954-18966.*
(Continued)

Primary Examiner — Li Liu
(74) Attorney, Agent, or Firm — Jefferson IP Law, LLP

(57) ABSTRACT

Disclosed are an electronic device, and a method for controlling same. Particularly, the present disclosure relates to an electronic device, and a method for controlling same, which can secure high visibility of a subject by acquiring, from an original image, a plurality of sub images having a smaller bit number than the original image, and acquiring a synthesized image on the basis of information about the shapes of objects included in the plurality of sub images.

14 Claims, 21 Drawing Sheets

(52) U.S. Cl.
CPC ............... *G06T 2207/20208* (2013.01); *G06T 2207/20221* (2013.01); *G06T 2207/30256* (2013.01)

(56) References Cited

U.S. PATENT DOCUMENTS

| | | | |
|---|---|---|---|
| 8,072,503 | B2 | 12/2011 | Tischer |
| 8,493,436 | B2 | 7/2013 | Lyon et al. |
| 8,817,160 | B2 | 8/2014 | Lee et al. |
| 9,137,451 | B2 | 9/2015 | Yang et al. |
| 9,148,561 | B2 | 9/2015 | Kubota |
| 9,392,184 | B2 | 7/2016 | Yang et al. |
| 9,426,378 | B2 | 8/2016 | Yang et al. |
| 9,571,743 | B2 | 2/2017 | Huang et al. |
| 9,615,012 | B2 | 4/2017 | Geiss et al. |
| 9,704,250 | B1 | 7/2017 | Shah et al. |
| 9,894,287 | B2 | 2/2018 | Qian et al. |
| 10,586,390 | B2 | 3/2020 | Han et al. |
| 10,627,228 | B2 | 4/2020 | Takemura et al. |
| 2002/0135703 | A1 | 9/2002 | Schmitz et al. |
| 2004/0090446 | A1* | 5/2004 | Lee ............... G09G 3/2081 345/691 |
| 2010/0232661 | A1 | 9/2010 | Hisanaga et al. |
| 2011/0176024 | A1 | 7/2011 | Kwon et al. |
| 2011/0211768 | A1 | 9/2011 | Thoms |
| 2012/0249844 | A1 | 10/2012 | Saito et al. |
| 2013/0163813 | A1 | 6/2013 | Shoji |
| 2013/0235232 | A1 | 9/2013 | Yang et al. |
| 2014/0325439 | A1 | 10/2014 | Sohn et al. |
| 2015/0296114 | A1 | 10/2015 | Yang et al. |
| 2015/0304537 | A1 | 10/2015 | Yang et al. |
| 2015/0341620 | A1 | 11/2015 | Han et al. |
| 2015/0350510 | A1 | 12/2015 | Han |
| 2016/0180541 | A1 | 6/2016 | Romanenko |
| 2017/0026594 | A1 | 1/2017 | Shida et al. |
| 2017/0054911 | A1 | 2/2017 | Lee et al. |
| 2017/0171449 | A1 | 6/2017 | Kino |
| 2018/0033206 | A1 | 2/2018 | Han et al. |
| 2018/0038689 | A1 | 2/2018 | Takemura et al. |
| 2018/0054559 | A1 | 2/2018 | Welker |
| 2018/0084180 | A1 | 3/2018 | Kim et al. |
| 2018/0124297 | A1 | 5/2018 | Matsuhashi et al. |
| 2018/0131913 | A1 | 5/2018 | Nakagoshi |
| 2018/0165809 | A1* | 6/2018 | Stanitsas ............... G06T 5/40 |
| 2018/0246521 | A1 | 8/2018 | Seo et al. |
| 2018/0278824 | A1 | 9/2018 | Somasundaram et al. |
| 2019/0222769 | A1 | 7/2019 | Srivastava et al. |
| 2020/0014864 | A1 | 1/2020 | Kang |
| 2020/0358966 | A1 | 11/2020 | Lee et al. |

FOREIGN PATENT DOCUMENTS

| | | |
|---|---|---|
| CN | 107045715 A | 8/2017 |
| CN | 107665485 A | 2/2018 |
| CN | 107925729 A | 4/2018 |
| CN | 108259774 A | 7/2018 |
| JP | 2007-214813 A | 8/2007 |
| JP | 2009-017474 A | 1/2009 |
| JP | 2011-254340 A | 12/2011 |
| JP | 2013-066247 A | 4/2013 |
| JP | 2015-207861 A | 11/2015 |
| JP | 2016-148962 A | 8/2016 |
| JP | 2016-184154 A | 10/2016 |
| JP | 6259185 B2 | 1/2018 |
| KR | 10-2001-0067778 A | 7/2001 |
| KR | 10-2008-0018631 A | 2/2008 |
| KR | 10-2010-0053287 A | 5/2010 |
| KR | 10-2013-0021496 A | 3/2013 |
| KR | 10-1714641 B1 | 3/2017 |
| KR | 10-2018-0023644 A | 3/2018 |
| KR | 10-1866676 B1 | 6/2018 |
| KR | 10-2018-0102331 A | 9/2018 |
| KR | 10-2019-0084463 A | 7/2019 |
| WO | 2017/196670 A1 | 11/2017 |

OTHER PUBLICATIONS

Lin, Chih-Yang, Zhi-Yao Jian, and Wei-Yang Lin. "Image bit-planes representation for moving object detection in real-time video surveillance." 2016 IEEE International Conference on Consumer Electronics—Taiwan (ICCE—TW). IEEE, 2016.*
Wang, Huiyuan, et al. "Application of image correction and bit-plane fusion in generalized PCA based face recognition." Pattern Recognition Letters 28.16 (2007): 2352-2358.*
Chinese Office Action dated Oct. 28, 2022, issued in Chinese Patent Application No. 201980071198.3.
Korean Office Action dated Nov. 7, 2022, issued in Korean Patent Application No. 10-2018-0127399.
U.S. Final Office Action dated Nov. 9, 2022, issued in U.S. Appl. No. 17/289,977.
U.S. Office Action dated Apr. 28, 2022, issued in U.S. Appl. No. 17/289,977.
European Examination Report dated Jan. 19, 2023, issued in European Application No. 19882935.0.
European Examination Report dated Feb. 15, 2023, issued in European Application No. 19876463.1.
U.S. Office Action dated Mar. 24, 2023, issued in U.S. Appl. No. 17/289,977.
High Dynamic Range Video: From Acquisition, to Display and Applications, p. 311 (2016).
European Search Report dated Sep. 21, 2021, issued in European Application No. 19882935.0.
European Search Report dated Oct. 8, 2021, issued in European Application No. 19876463.1.
Chinese Office Action dated May 11, 2023, issued in Chinese Patent Application No. 201980071198.3.
Recognition of insulator based on developed MPEG-7 texture feature.
Korean Office Action dated Dec. 15, 2023, issued in Korean Patent Application No. 10-2018-0136333.
Chinese Office Action dated Jan. 16, 2024, issued in Chinese Patent Application No. 201980057700.5.
Decision Rejection dated Aug. 15, 2023, issued in Chinese Patent Application No. 201980071198.3.
U.S. Notice of Allowance dated Sep. 19, 2023, issued in U.S. Appl. No. 17/289,977.

* cited by examiner

902

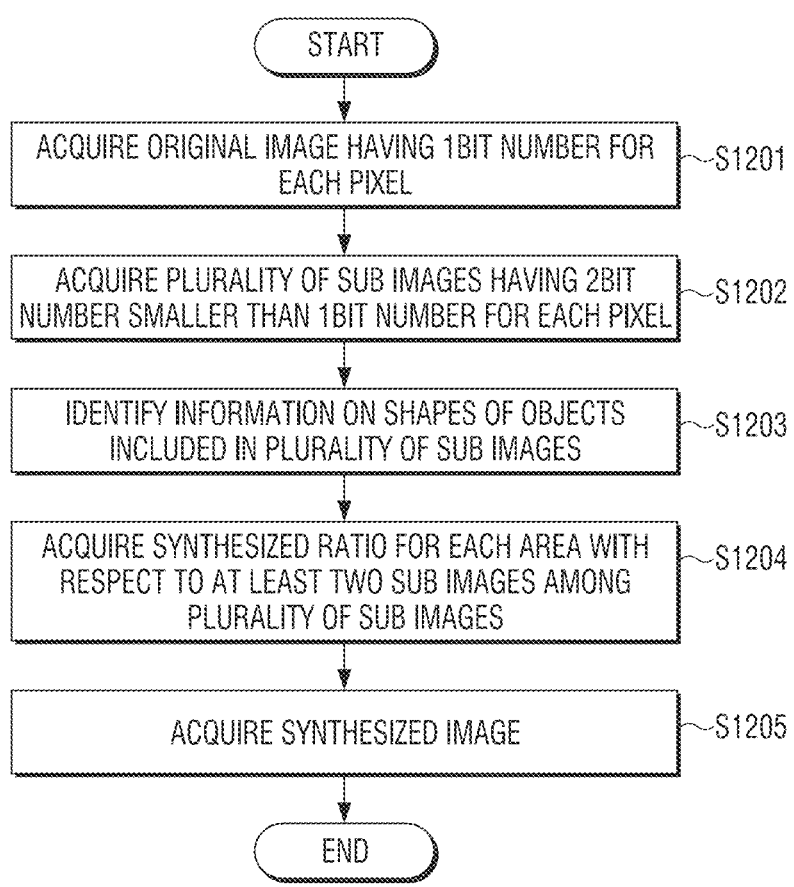

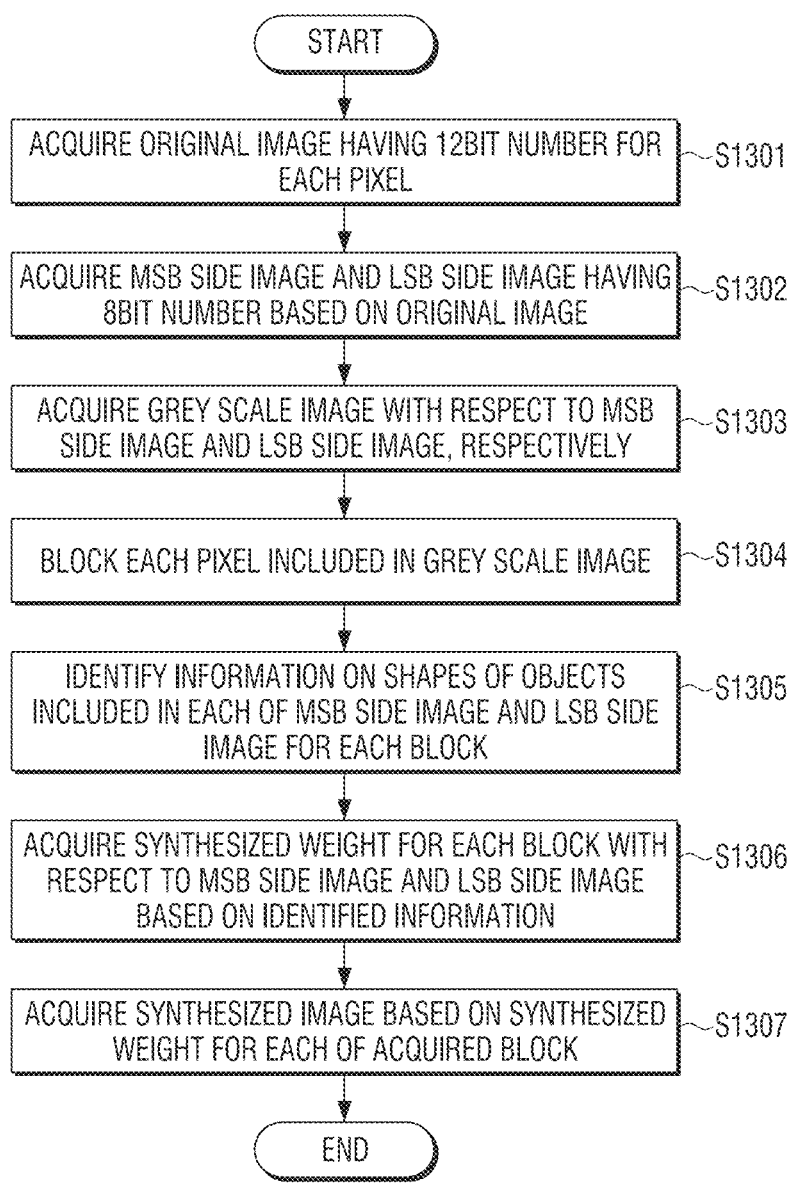

ELECTRONIC DEVICE AND METHOD FOR ACQUIRING A SYNTHESIZED IMAGE

TECHNICAL FIELD

The disclosure relates to an electronic apparatus and a method for controlling the electronic apparatus. More particularly, the disclosure relates to an electronic apparatus, and a method for controlling the same, which can secure high visibility of a subject by acquiring, from an original image, a plurality of sub images having a smaller bit number than the original image, and acquiring a synthesized image based on information about the shapes of objects included in the plurality of sub images.

BACKGROUND ART

In recent years, high dynamic range (HDR) technology, which expands a range of brightness closer to what a person actually sees by making bright places brighter and dark places darker in digital images is being spotlighted.

However, in the case of the existing HDR technology, several images with different exposures had to be captured and then synthesized the images into one image in order to acquire one image. Thus, it is pointed out that the time required to acquire a desired image may be delayed, and motion artifacts may occur as a result of synthesis if a subject moves or a camera shakes during a process of capturing an image as a limitation Accordingly, there is a need for a technology capable of securing visibility of a subject in various lighting environments such as night, bad weather, backlight, etc. while overcoming the limitations of the prior art.

In addition, when a camera provided in a car, especially an autonomous vehicle, captures an image, it is a challenge to secure driving stability by smoothly recognizing objects that appear in front of the car even in various lighting environments encountered during the car driving.

DETAILED DESCRIPTION OF THE INVENTION

Technical Problem

The disclosure is devised to overcome the problems described above and provide an electronic apparatus and a method for controlling the same, which can secure high visibility of a subject by acquiring, from an original image, a plurality of sub images having a smaller bit number than the original image, and acquiring a synthesized image based on information about the shapes of objects included in the plurality of sub images.

Technical Solution

According to an embodiment of the disclosure, an electronic apparatus includes an image sensor, a memory including at least one command, and a processor configured to control the electronic apparatus being coupled to the image sensor and the memory.

The processor may be configured to acquire an original image having a 1-bit number for each pixel through the image sensor, acquire a plurality of sub images having a 2-bit number smaller than the 1-bit number for each pixel based on the original image, identify information on the shapes of objects included in the plurality of sub images from each of the plurality of sub images, acquire a synthesized weight for each area with respect to two sub images among the plurality of sub images based on the identified image, and acquire a synthesized image based on the synthesized weight for each of the acquired area.

The plurality of sub images may include a most significant (MSB) side image and a least significant bit (LSB) side image acquired based on the original image.

The processor may be configured to acquire a grayscale image with respect to each of the plurality of sub images, block each pixel included in the acquired grayscale image, and identify information on the shapes of objects included in the plurality of sub images for each block according to the blocking.

The processor may be configured to acquire a synthesized weight for each block with respect to at least two sub images among the plurality of sub images based on the information identified for each block.

The processor may be configured to identify information on the shapes of objects included in the plurality of sub images through an edge detection.

The processor may be configured to identify the information on the shapes of objects included in the plurality of sub images based on a histogram of oriented gradient (HOG) value.

The apparatus may further include a display and a user interface unit.

The processor may be configured to, based on the original image being acquired through the image sensor, control the display to display the acquired original image, based on a user command for selecting at least one area among a plurality of areas included in the displayed original image being imputed through the user interface unit, based on the information on the shapes of objects included in at least one of the selected areas among the plurality of sub images, acquire a synthesized weight for each area with respect to two sub images among the plurality of sub images.

According to an embodiment of the disclosure, a method of controlling an electronic apparatus includes acquiring an original image having a 1-bit number for each pixel through the image sensor, acquiring a plurality of sub images having a 2-bit number smaller than the 1-bit number for each pixel based on the original image, identifying information on the shapes of objects included in the plurality of sub images from each of the plurality of sub images, acquiring a synthesized weight for each area with respect to two sub images among the plurality of sub images based on the identified image, and acquiring a synthesized image based on the synthesized weight for each of the acquired area.

The plurality of sub images may include a most significant (MSB) side image and a least significant bit (LSB) side image acquired based on the original image.

The method may further include acquiring a grayscale image with respect to each of the plurality of sub images, and blocking each pixel included in the acquired grayscale image.

The identifying the information may include identifying information on the shapes of objects included in the plurality of sub images for each block according to the blocking.

The acquiring the synthesized weight for each of the areas may include acquiring a synthesized weight for each block with respect to at least two sub images among the plurality of sub images based on the information identified for each block.

The identifying the information may include identifying information on the shapes of objects included in the plurality of sub images through an edge detection The identifying the information may include identifying the information on the shapes of objects included in the plurality of sub images based on a histogram of oriented gradient (HOG) value.

The method may further include based on the original image being acquired through the image sensor, displaying the acquired original image.

The acquiring the synthesized weight for each of the areas may include, based on a user command for selecting at least one area among a plurality of areas included in the displayed original image being imputed, based on the information on the shapes of objects included in at least one of the selected areas among the plurality of sub images, acquire a synthesized weight for each area with respect to two sub images among the plurality of sub images.

BRIEF DESCRIPTION OF DRAWINGS

FIG. 12 is a flowchart schematically illustrating a method for controlling an electronic apparatus according to an embodiment; and FIG. 13 is a detailed flowchart illustrating a method for controlling an electronic apparatus according to an embodiment.

BEST MODE FOR IMPLEMENTING THE DISCLOSURE

Figure 1:
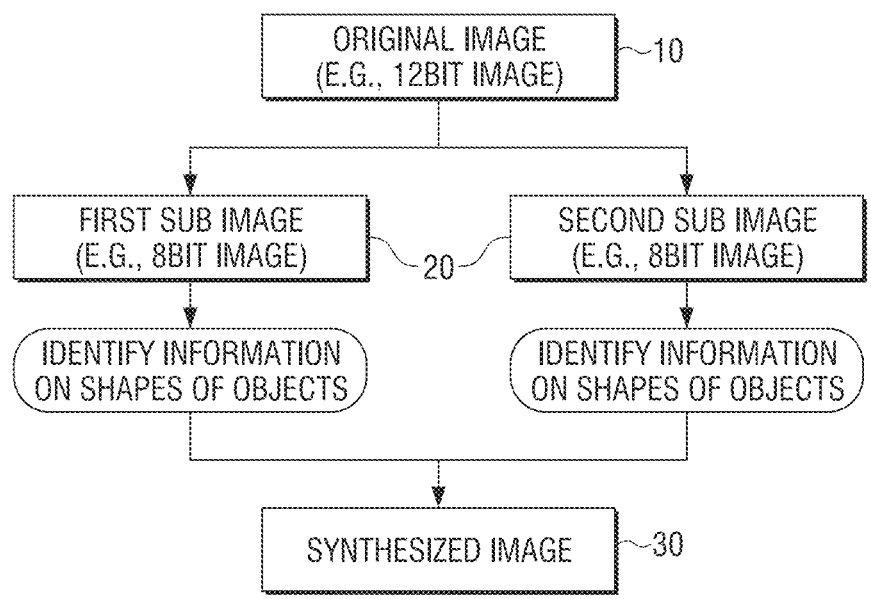
FIG. 1 is a view schematically illustrating a process of acquiring from an original image to a synthesized image according to an embodiment.

The disclosure may have several embodiments, and the embodiments may be modified variously. In the following description, specific embodiments are provided with accompanying drawings and detailed descriptions thereof. However, it should be understood that the present disclosure is not limited to the specific embodiments described hereinafter, but includes various modifications, equivalents, and/or alternatives of the embodiments of the present disclosure. In relation to explanation of the drawings, similar drawing reference numerals may be used for similar constituent elements.

In describing exemplary embodiments, detailed description of relevant known functions or components may be omitted if it would obscure the description of the subject matter.

In addition, the exemplary embodiments may be changed in various forms, and therefore, the technical scope is not limited to the following exemplary embodiments. Rather, these exemplary embodiments are provided to make the present disclosure thorough and complete.

The terms used herein are solely intended to explain a specific exemplary embodiment, and not to limit the scope of the present disclosure. Singular forms are intended to include plural forms unless the context clearly indicates otherwise.

The terms "have", "may have", "include", and "may include" used in the exemplary embodiments of the present disclosure indicate the presence of corresponding features (for example, elements such as numerical values, functions, operations, or parts), and do not preclude the presence of additional features.

In the description, the term "A or B", "at least one of A or/and B", or "one or more of A or/and B" may include all possible combinations of the items that are enumerated together. For example, the term "A or B" or "at least one of A or/and B" may designate (1) at least one A, (2) at least one B, or (3) both at least one A and at least one B.

The expression "1", "2", "first", or "second" as used herein may modify a variety of elements, irrespective of order and/or importance thereof, and only to distinguish one element from another. Accordingly, without limiting the corresponding elements.

When an element (e.g., a first element) is "operatively or communicatively coupled with/to" or "connected to" another element (e.g., a second element), an element may be directly coupled with another element or may be coupled through the other element (e.g., a third element).

Meanwhile, when an element (e.g., a first element) is "directly coupled with/to" or "directly connected to" another element (e.g., a second element), no other element (e.g., a third element) exists between an element and another element.

In the description, the term "configured to" may be changed to, for example, "suitable for", "having the capacity to", "designed to", "adapted to", "made to", or "capable of" under certain circumstances. The term "configured to (set to)" does not necessarily mean "specifically designed to" in a hardware level.

Under certain circumstances, the term "device configured to" may refer to "device capable of" doing something together with another device or components. For example, "a processor configured (or set) to perform A, B, and C" may mean a dedicated processor (e.g., an embedded processor) for performing the operation, or a generic-purpose processor (e.g., a CPU or an application processor) capable of performing corresponding operations by executing one or more software programs stored in a memory device In the embodiments disclosed herein, a term 'module' or 'unit' refers to an element that performs at least one function or operation. The 'module' or 'unit' may be realized as hardware, software, or combinations thereof. In addition, a plurality of 'modules' or 'units' may be integrated into at least one module and may be realized as at least one processor in an integrated manner except for 'modules' or 'units' that should be realized in specific hardware.

Further, various elements and areas in the drawings are schematically drawn. Therefore, the technical ideas are not limited by a relative size or interval drawn in the accompanying drawings.

The example embodiments of the disclosure will be described in greater detail below in a manner that will be understood by one of ordinary skill in the art.

FIG. 1 is a view illustrating a process of acquiring from an original image to a synthesized image according to an embodiment.

As illustrated in FIG. 1, the electronic apparatus according to an embodiment of the disclosure may acquire an original image 10. Specifically, the electronic apparatus may acquire an original image 10 having a 1-bit number for each pixel through an image sensor.

For example, the original image 10 may be an original image 10 having a 12-bit number per pixel. As such, in describing various embodiments of the disclosure, an image generated through an image sensor may be referred to the original image 10, and hereinafter, the original image 10 having the 12-bit number per pixel may be referred to as a 12-bit original image.

Meanwhile, the electronic apparatus according to an embodiment of the disclosure may acquire a plurality of sub images 20 based on the original image 10. Specifically, the electronic apparatus may acquire a plurality of sub images 20 having a 2-bit number smaller than the 1-bit number for each pixel based on the original image 10.

For example, the plurality of sub images 20 may be the first sub image and the second sub image 20 having an 8-bit number per pixel. As described above, in describing various embodiments of the disclosure, an image acquired from the original image 10 having a number of bits smaller than the number of bits of the original image 10 may be referred to as a sub image 20, and hereinafter, a sub image 20 having an 8-bit number for each pixel may be referred to as an 8-bit sub image 20, for convenience.

Various objects may be included in the plurality of sub images, and among the plurality of sub images, a specific sub image may include more information on the shapes of objects compared to the other sub images. In addition, even in the same sub image, the presence or absence of information on the shapes of objects and the amount of information on the shapes of the objects may be different for each of a plurality of areas included in the sub image.

Meanwhile, in each of the plurality of sub images 20, the electronic apparatus according to an embodiment of the disclosure may identify information on the shapes of objects included in the plurality of sub images 20.

In other words, the electronic apparatus may extract features on the shapes of objects included in the plurality of sub images 20 and identify information on the shapes of the objects based on the extracted features. Specifically, the electronic apparatus may identify the presence or absence of information on the shapes of objects and the amount of information on the shapes of the objects for each of a plurality of areas included in the plurality of sub images 20.

Meanwhile, the electronic apparatus according to an embodiment of the disclosure may acquire a synthesized weight for each area for at least two sub images 20 among the plurality of sub images 20 based on the identified information.

Specifically, as a result of identifying information on the shapes of objects included in the plurality of sub images 20, the electronic apparatus may assign a higher synthesized weight on an image including more information on the shapes of objects in a specific area among the plurality of sub images 20.

Meanwhile, the electronic apparatus according to an embodiment of the disclosure may acquire a synthesized image 30 based on the acquired synthesized weight for each area. As such, in describing various embodiments of the disclosure, an image synthesized based on a synthesized weight for each identified area is referred to as a synthesized image 30.

According to an embodiment of the disclosure as described above, a plurality of sub images 20 may be acquired from the original image 10, and the synthesized image 30 capable of securing visibility for all areas included in the image from the plurality of sub images 20 may be acquired.

Meanwhile, in describing the disclosure, the 1-bit number (e.g., 12-bit number) may be determined according to the amount of information acquired by the image sensor, and the 2-bit number (e.g., 8-bit number) may be determined in terms of optimization.

Specifically, in the image sensor, it is necessary to acquire information having a higher bit number compared to 8-bit in order to sense information having a wide dynamic range.

Meanwhile, optimization to reduce the amount of computation is required for an image processing process for an original image acquired through the image sensor, and particularly an image processing process performed through a deep learning-based algorithm. Therefore, the image processing process is generally optimized based on 8-bit, which is the smallest unit that can access a memory.

The disclosure considers the description above, and according to the disclosure, after acquiring the 12-bit original image 10 including information of a wide dynamic range, the 8-bit sub image 20 may be acquired within a range that can minimize loss of information from the original image, and the image processing process optimized based on the 8-bit may be performed.

In addition, even if the 8-bit synthesized image 30 is acquired from the 12-bit original image through the process described above, as much information as it can satisfy the range of expressions that can be recognized by the human eye is preserved.

Hereinafter, various embodiments according to the disclosure will be described, focusing on the configuration of the electronic apparatus according to the disclosure, with reference to FIGS. 2 and 3.

Figure 2:
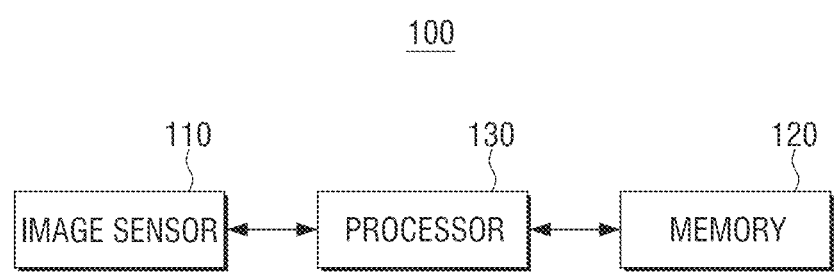
FIG. 2 is a block diagram illustrating a simplified configuration of an electronic apparatus according to an embodiment.

FIG. 2 is a block diagram illustrating a structure of an electronic apparatus, according to an example embodiment.

As shown in FIG. 2, the electronic apparatus 100 according to an embodiment of the disclosure may include an image sensor 110, a processor 130, and a memory 120.

The image sensor 110 may convert light entering through a lens into an electrical image signal. In addition, the processor 130 may acquire an original image of a subject through the image sensor 110.

Meanwhile, the image sensor 110 may be a charge coupled device (CCD) sensor or a complementary metal oxide semiconductor (CMOS) sensor, but the image sensor 110 according to the disclosure is not limited thereto.

The memory 120 may include at least one command related to the electronic apparatus 100. In addition, an operating system (O/S) for driving the electronic apparatus 100 may be stored in the memory 120. In addition, various software programs or applications for operating the electronic apparatus 100 may be stored in the memory 120 according to various embodiments of the disclosure.

In addition, the memory 120 may include various software modules for operating the electronic apparatus 100 according to various embodiments of the disclosure, and the processor 130 may execute various software modules stored in the memory 120 to operate an operation of the electronic apparatus 100 according to various embodiments of the disclosure.

In particular, according to various embodiments of the disclosure, the memory 120 may store software based on various algorithms related to edge detection, such as a Laplacian mask, a Sobel mask, a Roberts mask, a Prewitt mask, a Canny mask, or the like. Such edge detection will be described below.

According to various embodiments of the disclosure, the memory 120 may store various types of image data. Specifically, the memory 120 may store data related to an original image, a plurality of sub images, a synthesized image, or the like according to the disclosure. Meanwhile, the memory 120 may include a semiconductor memory such as a flash memory, or a magnetic storage medium such as a hard disk, or the like.

The processor 130 may control the overall operation of the electronic apparatus 100. Specifically, the processor 130 may be connected to the image sensor 110 and the memory 120 of the electronic apparatus 100 to control the overall operation of the electronic apparatus 100.

The processor 130 may be realized in various methods. For example, the processor 130 may be at least one of an application-specific integrated circuit (ASIC), an embedded processor, a microprocessor, hardware control logic, hardware finite state machine (FSM), and a digital signal processor (DSP).

The processor 130 may include read-only memory (ROM), random access memory (RAM), a graphic processing unit (GPU), a central processing unit (CPU), and a bus. The ROM, the RAM, the GPU and the CPU may be connected with each other through the bus.

In particular, according to various embodiments of the disclosure, the processor 130 may acquire an original image having the 1-bit number for each pixel through the image sensor 110. The 1-bit number may be determined from a viewpoint of acquiring an original image having a wide dynamic range. In other words, according to the disclosure, the processor 130 may acquire an original image having a higher bit number than a bit number per pixel suitable for an image processing process through a so-called high dynamic range image sensor 110.

For example, the processor 130 may acquire an original image having 10-bit, 12-bit, 16-bit, or 24-bit number per pixel through the image sensor 110.

When the original image is acquired, the processor 130 may acquire a plurality of sub images having a 2-bit number smaller than the 1-bit number for each pixel based on the original image. The second-bit number may be determined in terms of optimization of an image processing process. In other words, according to the disclosure, the processor 130 may acquire a plurality of sub images having a bit number per pixel in a smallest unit accessible to the memory 120 based on the acquired original image.

For example, when the original image acquired through the image sensor 110 has 10-bit, 12-bit, 16-bit, or 24-bit per pixel, the processor 130 may acquire the plurality of sub images having an 8-bit number per pixel may be acquired.

In other words, according to the disclosure, the processor 130 may acquire an original image including information of the wide dynamic range, and then acquire the plurality of sub images within a range capable of minimizing loss of information from the original image, and perform an optimized image processing process based on the acquired plurality of sub images.

Meanwhile, various objects may be included in the plurality of sub images acquired from the original image, and among the plurality of sub images, a specific sub-image may include more information on the shapes of the objects than other sub images. In addition, even in the same sub image, the presence or absence of information on the shapes of objects and the amount of information on the shapes of the objects may be different for each of a plurality of areas included in the sub image.

When a plurality of sub images are acquired, the processor 130 may identify information on the shapes of objects included in the plurality of sub images from each of the plurality of sub images.

Meanwhile, in image processing, various methods exist for extracting various features included in a specific image and obtaining various information from the extracted features. Particularly, according to various embodiments of the disclosure, the processor 130 may extract features of the shapes of objects included in the plurality of sub images, and identify information on the shapes of objects based on the extracted features.

When information on the types of objects included in the plurality of sub images is identified, the processor 130 may acquire a synthesized weight for each area of at least two of the plurality of sub images based on the identified information. Further, the processor 130 may obtain a synthesized image based on the acquired synthesized weight for each area.

Specifically, as a result of identifying information on the types of objects included in the plurality of sub images in each of the plurality of sub images, the electronic apparatus may assign a relatively high synthesized weight to an image including more information on the types of objects than other images in a specific area among the plurality of sub images.

For example, as a result of identifying information on the types of objects included in the plurality of sub images in each of the plurality of sub images, when the first sub image among the plurality of sub images for a specific area contains twice as much information on the shapes of the objects as compared to the second sub image among the plurality of sub images, in obtaining a synthesized image, the processor 130 may synthesize the first sub image and the second sub image by assigning a synthesized weight of the first sub image to twice a synthesized weight of the second sub image.

According to the electronic apparatus 100 as described above, a plurality of sub images having a smaller bit number than the original image may be acquired from the original image, and a synthesized image capable of securing visibility for an entire area included in the image bead on information on the shapes of the objects included in the plurality of sub images, and the problem of motion artifacts of the prior art may be solved simultaneously.

Meanwhile, the case of the original image having the 10-bit number, the 12-bit number, the 16-bit number, or the-24-bit number per pixel, and the plurality of sub images having the number of 8-bit number per pixel have been described as an example in the above, but is not limited to an image having a specific number of bits for each pixel.

In other words, within a range capable of achieving the object of the disclosure, the bit number per pixel of the original image, the plurality of sub images, and further the synthesized image according to the disclosure may be variously determined. However, hereinbelow, it is described that, for convenience, the original image mainly has bit number per pixel, and the plurality of sub images and synthesized images acquired therefrom have an 8-bit number per pixel.

Figure 3:
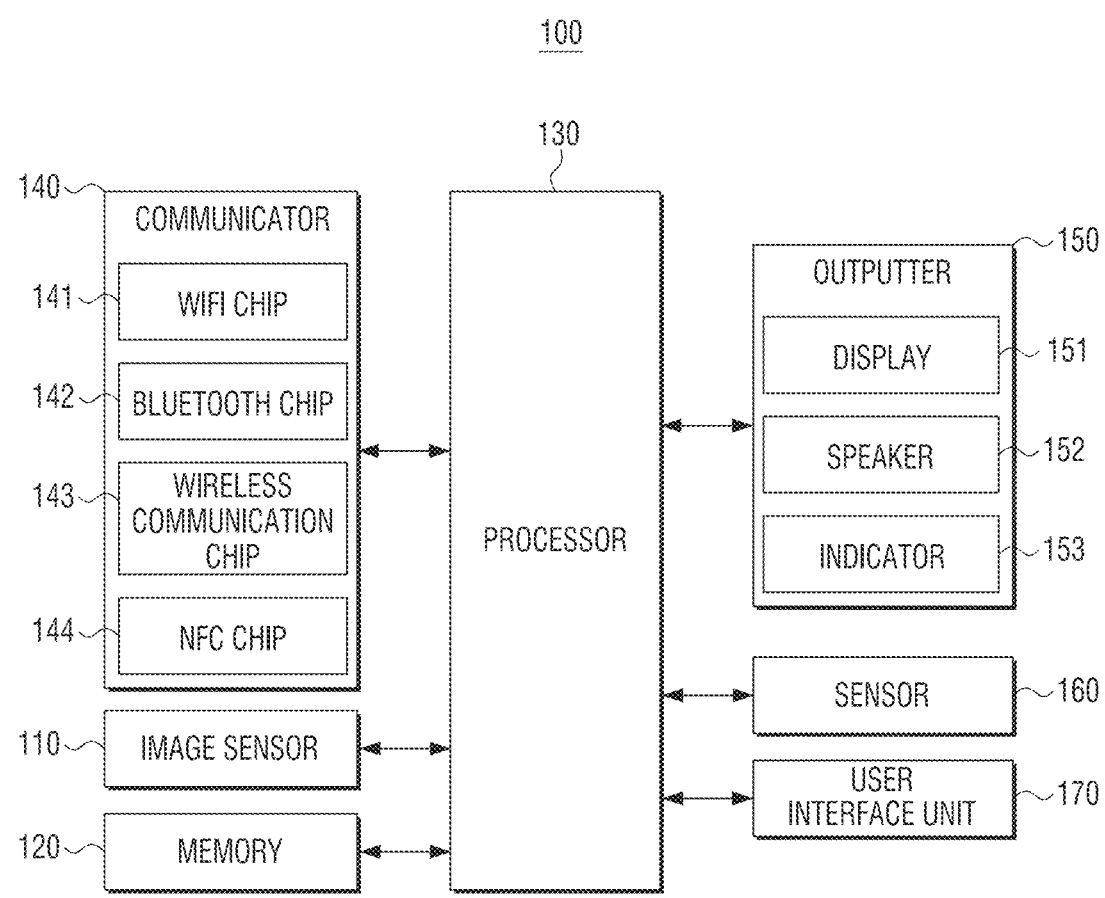
FIG. 3 is a block diagram illustrating a detailed configuration of an electronic apparatus according to an embodiment.

FIG. 3 is a block diagram illustrating a detailed configuration of an electronic apparatus according to an embodiment.

As illustrated in FIG. 3, the electronic apparatus 100 according to an embodiment of the disclosure may include not only an image sensor 110, a memory 120, and a processor 130, but also a communicator 140 and an outputter 150, a sensor 160, and a user interface unit 170. However, such a configuration is exemplary, and it is obvious that a new configuration may be added or some configurations may be omitted in addition to the above configuration in performing the disclosure.

The image sensor 110 may convert light entering through a lens into an electrical image signal, and the processor 130 may acquire an original image of a subject through the image sensor 110.

The memory 120 may include at least one command related to the electronic apparatus 100. The memory 120 may store software based on various algorithms related to edge detection, and the memory 120 may store data related to an original image, a plurality of sub images, and a synthesized image according to the disclosure.

The processor 130 may control the overall operation of the electronic apparatus 100. Specifically, the processor 130 may be connected to the image sensor 110, the memory 120, the communicator 140, the outputter 150, the sensor 160, and the user interface unit 170 of the electronic apparatus 100 to control the overall operation of the electronic apparatus 100.

Detailed descriptions of the other image sensor 110, memory 120, and processor 130 have been described above in the description of FIG. 1, and redundant descriptions will be omitted.

Meanwhile, the communicator 140 may communicate with the external electronic apparatus (not illustrated) or the external server (not illustrated). The communicator 140 may include at least one of a Wi-Fi chip 141, a Bluetooth chip 142, a wireless communication chip 143, and a near field communication (NFC) chip 144.

In particular, the Wi-Fi chip 141 and the Bluetooth chip 142 may communicate in the Wi-Fi method and the Bluetooth method, respectively. When the Wi-Fi chip 141 or the Bluetooth chip 142 is used, a variety of connection information such as an SSID, etc. may be exchanged first, and after communication connection using the same, various types of information may be transmitted and received.

The wireless communication chip 143 refers to a chip that performs communication according to the various communication standards such as IEEE, Zigbee, 3rd Generation (3G), 3rd Generation Partnership Project (3GPP), Long Term Evolution (LTE), and so on. The NFC chip 144 indicates chip to operate in NFC method using 13.56 MHz bandwidth among various RF-ID frequency bandwidths such as 135 kHz, 13.56 MHz, 433 MHz, 860~960 MHz, and 2.45 GHz.

In particular, in various embodiments of the disclosure, the communicator 140 may receive a signal regarding an original image by performing communication with an external electronic apparatus (not illustrated) or a server (not illustrated). Further, the processor 130 may acquire the original image through the communicator.

In other words, an embodiment that the processor 130 acquires an original image through the image sensor 110 has been described in the above, but the original image according to the disclosure may be acquired from an external electronic apparatus (not shown) or a server (not illustrated) through the communicator.

Specifically, the processor 130 may acquire an original image having a 1-bit number for each pixel through the communicator 140, and based on the original image, a plurality of sub images having a 2-bit number smaller than the 1-bit number for each pixel based on the original image.

In addition, the processor 130 may identify information on the shapes of objects included in the plurality of sub images from each of the plurality of sub images, and based on the identified information, the processor 130 may acquire a synthesized weight for each area of at least two sub images among a plurality of sub images, and further acquire a synthesis image based on the acquired synthesized weight for each area.

In addition, various embodiments of the disclosure may be applied not only when the original image is acquired through the image sensor 110 of the electronic apparatus, but also when the original image is acquired through the communicator 140 of the electronic apparatus.

Meanwhile, it has been described the image sensor 110 is included in some components of the electronic apparatus 100 in the above, but the disclosure is not necessarily limited thereto.

In other words, in order to reduce power consumption, unlike a general electronic apparatus or a photographing device, only the image sensor may be separated and implemented as an external image sensor (not illustrated). In this case, the processor 130 may acquire the original image from the external image sensor (not illustrated) through the communicator 140, and further, a synthesized image may be acquired through the process described above. The outputter 150 may output various functions that can be performed by the electronic apparatus. The inputter 150 may include at least one of a display 151, a speaker 152, and an indicator 153.

The display 151 may output image data under the control of the processor 130. In particular, in an embodiment of the disclosure, when the processor 130 may acquire an original image, acquire a plurality of sub images based on the original image, and acquire a synthesize image based on a plurality of sub images, the processor 130 may control the display 151 to display the original image, the plurality of sub images, and the synthesized image.

In addition, the display 151 may display an image or a user interface pre-stored in the memory 120 under the control of the processor 130.

Meanwhile, the display 151 may be implemented as a liquid crystal display panel (LCD), organic light emitting diodes (OLED), or the like, and the display 151 may also be implemented as a flexible display, a transparent display, etc. depending on a case. However, the display 151 according to the disclosure is not limited to a specific type.

The speaker 152 may output audio data under the control of the processor 130, and the indicator 153 may be lit under the control of the processor 130.

Specifically, in an embodiment of the disclosure, when the processor 130 may acquire an original image, acquire a plurality of sub images based on the original image, and acquire a synthesized image based on the plurality of sub images, the processor 130 may control the speaker 152 or the indicator 153 to output a voice or turn on an LED whenever each image is acquired.

The sensor 160 may detect various types of input. Specifically, the sensor 160 may be a touch sensor that senses a user touch, and the electronic apparatus according to the disclosure may include various sensors such as a motion sensor, a temperature sensor, a humidity sensor, an illuminance sensor, or the like.

The user interface unit 170 is an element that senses a user interaction for controlling an overall operation of the electronic apparatus 100. Specifically, the user interface unit 150 may be composed of a camera, a microphone, a remote-control signal receiver, or the like. Meanwhile, the user interface unit 170 may be implemented in a form included in the display 151 as a touch screen.

Meanwhile, as described above, when the original image is acquired through the image sensor 110, the processor 130 may control the display 151 to display the acquired original image.

In addition, when a user command for selecting at least one of the plurality of areas included in the displayed original image is input through the user interface unit 170, the processor 130 may acquire synthesized weight for each area of at least two sub images among a plurality of sub images based on the information on the shapes of objects included in at least one area selected from the plurality of sub images.

As described above, an embodiment of inputting a user command for selecting at least one of a plurality of areas included in the original image will be described in detail with reference to FIG. 10.

Meanwhile, a process of acquiring from an original image to a synthesized image according to an exemplary embodiment of the disclosure will be described in more detail below with reference to FIGS. 4 to 8.

Figure 4:
FIG. 4 is a view illustrating an original image according to an embodiment.
Figure 5A:
FIGS. 5A and 5B are views illustrating two sub images separated from an original image illustrated in FIG. 4.
Figure 5B:
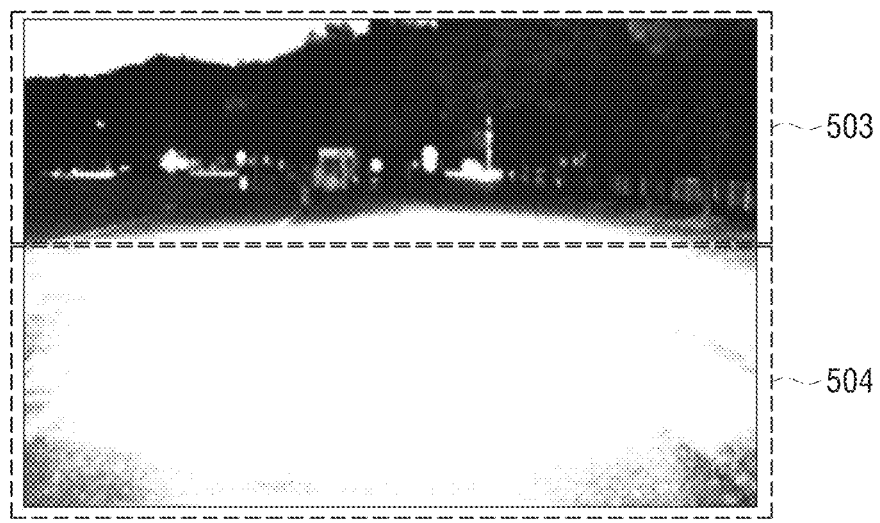

FIG. 4 is a view illustrating an original image according to an embodiment. FIGS. 5A and 5B are views illustrating two sub images separated from an original image illustrated in FIG. 4.

As described above, the disclosure is not limited to an image having a specific bit number per pixel, but hereinafter, the original image has a 12-bit number per pixel, and a sub image acquired from the original image has an 8-bit number per pixel. This will be explained using an example.

As described above, the processor 130 may acquire a 12-bit original image through the image sensor 110, and the processor 130 may acquire a plurality of 8-bit sub images smaller than 12-bit based on the original image.

Specifically, the plurality of sub images may include a most significant bit (MSB) side image and a least significant bit (LSB) side image acquired based on the original image.

The MSB side image is the most significant bit-side image, for example, based on a bit of the largest digit in the 12-bit original image, an 8-bit image that can be acquired based on information from the 1-bit to the 8-bit.

In addition, the LSB side image is the least significant bit side image, for example, based on a bit of the smallest digit in the 12-bit original image, an 8-bit image that can be acquired based on the information from the 1-bit to the 8-bit that can be acquired based on information from the 1-bit to the 8-bit.

The MSB side image that can be acquired from the 12-bit original image as shown in FIG. 4 is illustrated in FIG. 5A, and the LSB side image that can be acquired from the 12-bit original image as illustrated in FIG. 4 is shown in FIG. 5B.

As shown in FIGS. 5A and 5B, the MSB side image and the LSB side image acquired from the same original image may have different areas of high visibility for objects included in the image.

Specifically, a first area 501 of FIG. 5A indicating the MSB side image is expressed too dark, thereby making hard to easily identify the object included in the first area 501, whereas an object included in a second area 502 of FIG. 5A may be easily identified relative to the first area 501.

In addition, an object included in a third area 503 of FIG. 5B representing the LSB side image may be identified relatively easily, whereas a fourth area 504 of FIG. 5B is expressed too brightly and thus an object included in the fourth area may not be easily identified relative to the third area 503.

Accordingly, when synthesized weights for the second area 502 of FIG. 5A and the third area 503 of FIG. 5B are assigned higher than synthesized weights of the first area 501 of FIG. 5A and the fourth area 504 of FIG. 5B, the synthesized image acquired as a result of the synthesis may secure high visibility for all areas included in the image compared to the original image.

Meanwhile, in the above, the image illustrated in FIGS. 5A and 5B is divided into two areas and specified as the first area 501, the second area 502, the third area 503, and the fourth area 504 for convenience. However, specifically, the visibility of objects included in each image may vary for each pixel included in the image. Also, the visibility of objects included in each image may vary according to various lighting environments.

FIGS. 6A to 6F are views illustrating a process of identifying information on the shapes of objects included in sub images in each of the two sub images illustrated in FIGS. 5A and 5B.

According to various embodiments of the disclosure, in each of the plurality of sub images, the processor 130 may identify information on the shapes of objects included in the plurality of sub images. Specifically, the processor 130 uses various methods such as edge detection, histogram feature detection, image high frequency analysis, image variance analysis, corner detection or the like to identify the information on the shapes of objects included in the plurality of sub images.

For example, the processor 130 may detect an edge in which a brightness of an image changes from a high value to a low value or from a low value to a high value in the plurality of sub-images to identify information on the shapes of objects included in the plurality of sub images.

In the edge detection, various methods such as a method using a Laplacian mask, a Sobel mask, a Roberts mask, a Prewitt mask, or a Canny mask may be used, and the disclosure is not limited to a specific method.

Figure 6A:
FIGS. 6A to 6F are views illustrating a process of identifying information on the shapes of objects included in sub images in each of the two sub images illustrated in FIGS. 5A and 5B.
Figure 6B:

FIGS. 6A and 6B are views illustrating a process of identifying information on the shapes of objects included in the sub-images by performing edge detection using the Laplacian mask for each of the two sub images illustrated in FIGS. 5A and 5B.

Specifically, FIG. 6A is a view illustrating the result of performing the edge detection using the Laplacian mask on the MSB side image illustrated in FIG. 5A, and FIG. 6B is view illustrating the result of performing the edge detection using the Laplacian mask on the LSB side image illustrated in FIG. 5B.

Figure 6C:
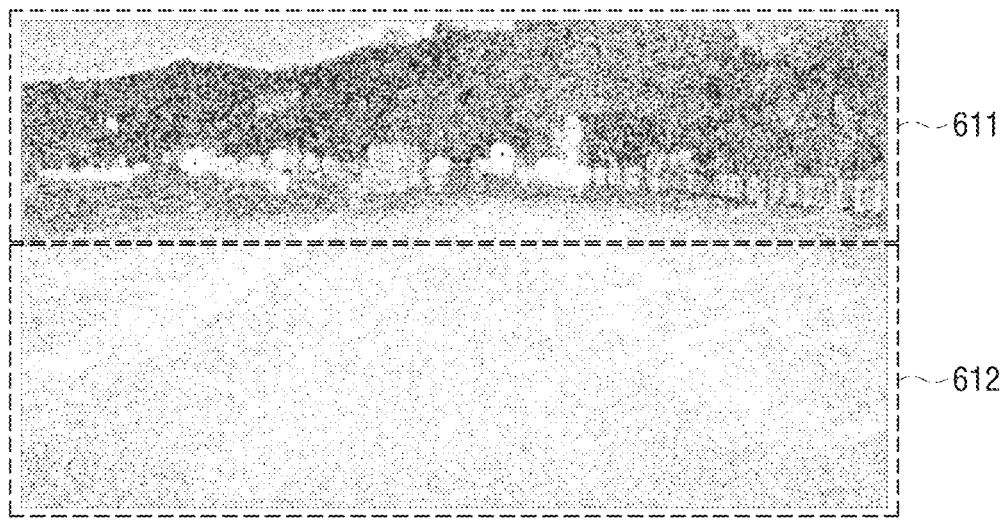
Figure 6D:
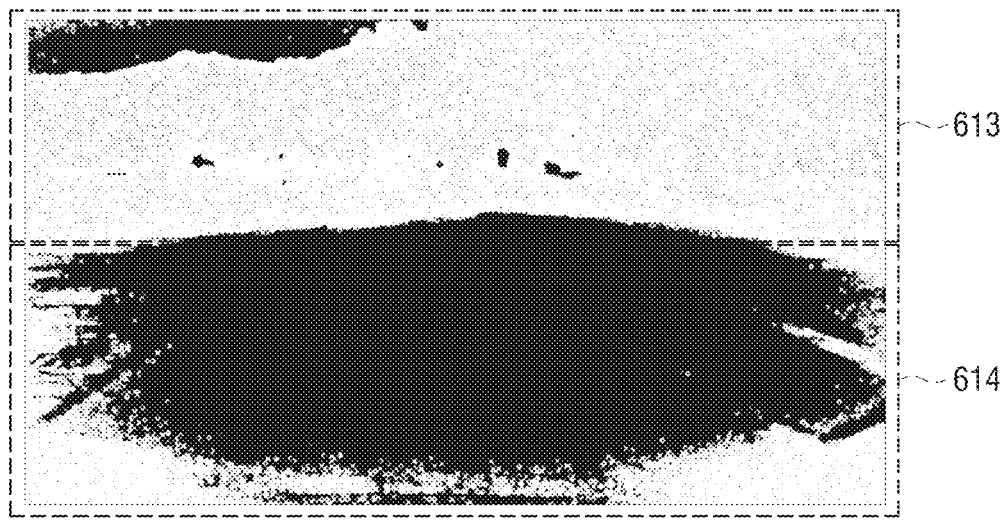

Referring to 6A and 6B, it may be identified that the amount of the detected edge is smaller in a first area 601 of FIG. 6A compared to a third area 603 of FIG. 6B, and the amount of the detected edge is larger in a second area 602 of FIG. 6A compared to a fourth area 604 of FIG. 6D. Here, the large amount of detected edge means that there is a large amount of information about the shapes of objects.

In the case of synthesizing by giving synthesized weights for the second area 602 of FIG. 6A and the third area 603 of FIG. 6B higher than synthesized weights for the first area 601 of FIG. 6A and the fourth area 604 of FIG. 6B, the synthesized image acquired as a result of the synthesis may secure high visibility for all areas included in the image.

Meanwhile, FIGS. 6C and 6D are view illustrating a process of identifying information on the shapes of objects included in the sub images by performing edge detection using Sobel masks for each of the two sub images shown in FIGS. 5A and 5B.

Specifically, FIG. 6C is a view illustrating a result of performing edge detection using the Sobel mask on the MSB side image shown in FIG. 5A, and FIG. 6D is a view illustrating the result of performing the edge detection using the Sobel mask on the LSB side image shown in FIG. 5B.

Referring to FIGS. 6C and 6D, blocks included in a second area 612 of FIG. 6C are displayed relatively brighter than the blocks included in a first area 611 of FIG. 6C. On the other hand, blocks included in a fourth area 614 of FIG. 6D are relatively darker compared to the blocks included in a third area 613 of FIG. 6B. Here, the area which is expressed relatively brighter means that there is more information on the shapes of the objects than the area expressed relatively darker.

Accordingly, in the case of synthesizing by giving synthesized weights for the second area 612 of FIG. 6C and the third area 613 of FIG. 6D higher than synthesized weights for the first area 611 of FIG. 6C and the fourth area 614 of FIG. 6D, the synthesized image acquired as a result of the synthesis may secure high visibility for all areas included in the image.

Meanwhile, the processor 130 may identify information on the shapes of objects included in the plurality of sub images based on a histogram of oriented gradient (HOG) value. Specifically, the processor 130 may divide the areas of the plurality of sub images into cells of a predetermined size, and for each cell, the processor may obtain a histogram of the directions of edge pixels with a slope value equal to or greater than a certain value, and then obtain a vector connecting these histogram bin values to identify information on the shapes of objects included in the plurality of sub-images.

In addition, the processor 130 may identify information on the shapes of objects included in the plurality of sub images based on a high-frequency image analysis. Specifically, the processor 130 may identify information on the shapes of objects included in the plurality of sub images by analyzing a high-frequency component having a large change rate of a pixel value among frequency components included in the plurality of sub images.

In addition, the processor 130 may identify information on the shapes of objects included in the plurality of sub images based on image variance analysis. Specifically, the processor 130 may identify information on the shapes of objects included in the plurality of sub images by statistically analyzing a distribution of image data included in the plurality of sub images.

Further, the processor 130 may identify information on the shapes of objects included in the plurality of sub images through various methods including a corner detection method.

In the above, various methods for identifying information on the types of objects included in the plurality of sub images have been described. In addition to the above-described methods, various methods for identifying information on the shapes of objects may be used within a range that can achieve the object of the disclosure.

Meanwhile, the process of identifying information on the types of objects included in the plurality of sub images by various methods as described above may be performed for each pixel included in the plurality of sub images, but for the efficiency and speed of the image processing process. As will be described below, the processor 130 may identify information on the shapes of objects included in the plurality of sub images for each block after performing blocking for each pixel.

For example, the processor 130 may block 1280×720 pixels included in the entire plurality of sub images to be included in 32×18 blocks.

In addition, the processor 130 may identify information on the shapes of objects included in the plurality of sub images for each block according to the blocking. Specifically, the processor 130 may identify information on the shapes of objects included in the plurality of sub images for each block according to blocking by using various methods as described above, such as edge detection, or the like.

Meanwhile, in order to reduce the computational amount of image processing, the processor 130 may acquire a grayscale image for each of the plurality of sub images prior to performing blocking on each pixel, and block each pixel included in the acquired grayscale image.

Specifically, the processor 130 may convert the plurality of sub images acquired as a color image into grayscale images, respectively. In the process of acquiring the grayscale image, a method of using color luminance has been mainly used, but the process of acquiring the grayscale image according to the disclosure is not limited to a specific method.

Figure 6E:
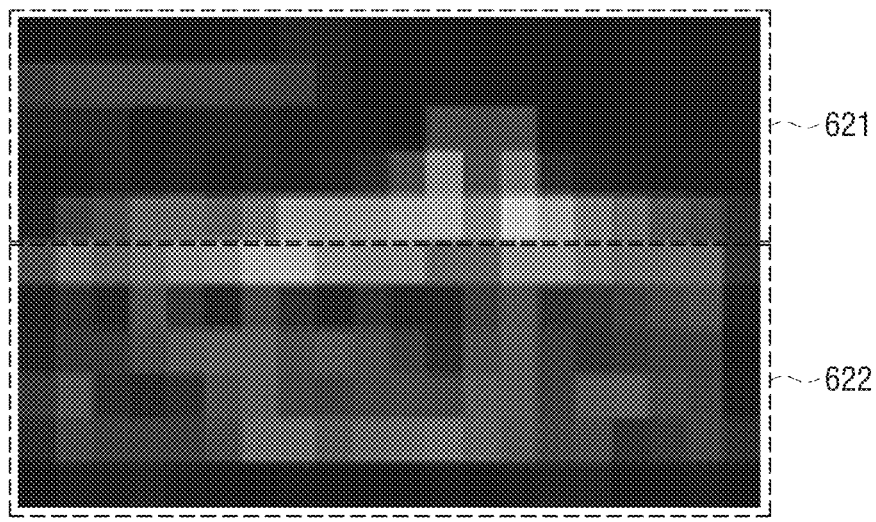

FIG. 6E is a view illustrating a result of acquiring a grayscale image of the MSB side image, and performing edge detection after blocking each pixel included in the acquired grayscale image, as illustrated in FIG. 5A.

Figure 6F:
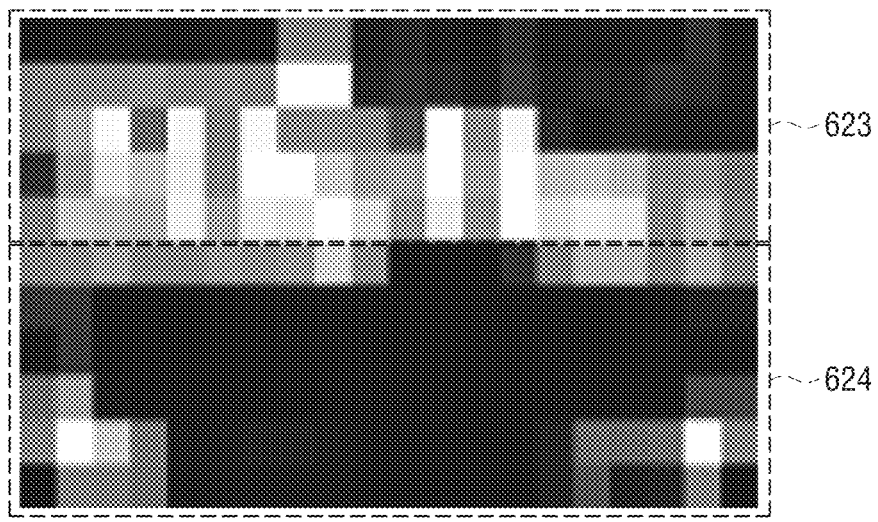

In addition, FIG. 6F is a view illustrating a result of acquiring a grayscale image of the LSB side image, and performing edge detection after blocking each pixel included in the acquired grayscale image, as illustrated in FIG. 5B.

Referring to FIG. 6E, blocks included in a second area 622 of FIG. 6E are displayed relatively brighter than the blocks included in a first area 621 of FIG. 6E. Further, referring to FIG. 6F, blocks included in a fourth area 624 of FIG. 6F are relatively dark compared to the blocks included in a third area 623 of FIG. 6F.

Here, blocks expressed in dark indicate that there is little information on the shapes of objects in the area included in the blocks, and blocks expressed in bright indicate that there is much information about the shapes of objects in the area included in the blocks.

In other words, as a result of performing edge detection, the processor 130 may identify the presence or absence of information on the shapes of objects included in the image for each block, as well as the amount of information on the shapes of the objects.

Accordingly, in the case of synthesizing by giving synthesized weights for the second area 622 of FIG. 6E and the third area 623 of FIG. 6F higher than synthesized weights for the first area 621 of FIG. 6E and the fourth area 624 of FIG. 6F, the synthesized image acquired as a result of the synthesis may secure high visibility for all areas included in the image.

In the above, the images illustrated in FIGS. 5A to 6F are divided into two areas and specified for convenience, but specifically, the feature that the visibility of objects included in each image may vary for each pixel included in the image has been described above.

Meanwhile, the method of identifying information on the shapes of objects after converting the plurality of sub images into grayscale images and blocking each pixel included in the converted grayscale image has been described in the above, the process of converting and blocking grayscale images is not necessary to achieve the object of the present disclosure.

In particular, if the method is applied after performing the blocking process depending on the method for identifying information on the shapes of objects, it may be difficult to identify the information on the shapes of objects, or rather, the amount of computation of the overall image processing may increase. Thus, whether or not to perform the blocking process should be determined in relation to a specific method for identifying information on the shapes of objects.

Based on the information identified as described above, the processor 130 may acquire a synthesized weight for each area of the MSB side image and the LSB side image, which will be described in detail with reference to FIGS. 7 and 8.

Figure 7:
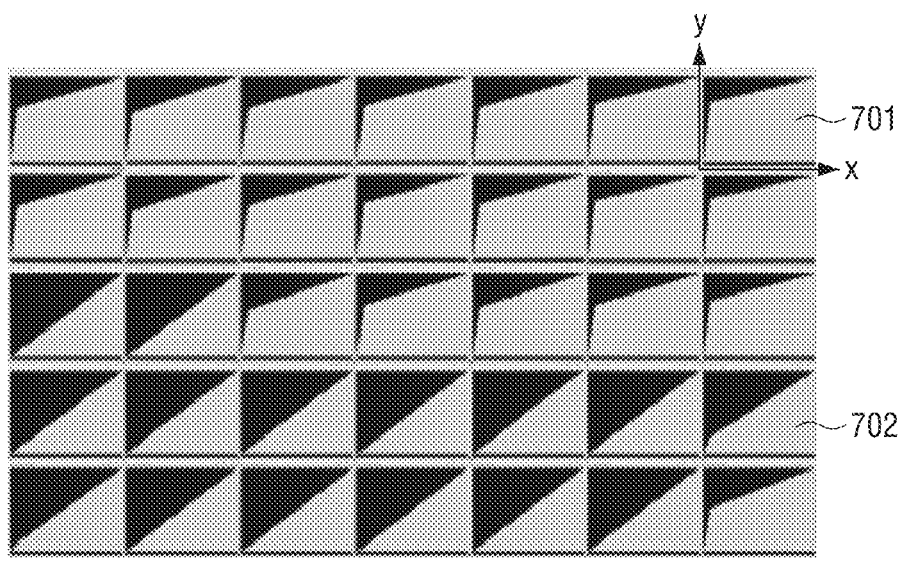
FIG. 7 is a graph illustrating a synthesized weight for two sub images according to an embodiment.
Figure 8:
FIG. 8 is a view illustrating a synthesized image acquired based on a synthesized weight for each area of two sub images illustrated in FIGS. 5A and 5B.

FIG. 7 is a graph illustrating a synthesized weight for two sub images according to an embodiment of the disclosure, and FIG. 8 is a view illustrating an acquired synthesized image based on a synthesized weight for each area of the two sub images shown in FIGS. 5A and 5B.

When information on the shapes of objects included in the plurality of sub images is identified, the processor 130 may acquire a synthesized weight for each area of at least two sub images among the plurality of sub images based on the identified information.

As described above, the shapes of objects included in the plurality of sub images for each block are identified after a grayscale image for each of the plurality of sub images is acquired, and each pixel included in the acquired grayscale image is blocked, the processor 130 may acquire a synthesized weight for each block for at least two of the plurality of sub images based on the information identified for each block.

The synthesized weight for each block as described above may be referred to as a dynamic curve for each block as shown in FIG. 7. Here, an x-axis refers to data of an input original image, and a y-axis refers to data of an output synthesized image. For example, when a 12-bit original image is input, the x-axis represents a value from 0 to 4095, and when an 8-bit synthesized image is output, the y-axis represents a value from 0 to 255.

Specifically, in the case of the graph shown in a first block 701 of FIG. 7, a slope of a graph corresponding to an input initial value is formed larger than that of a second block 702. This indicates that in the case of the area corresponding to the first block 701, the synthesize weight for the LSB side image is higher than the synthesized weight for the MSB side image as compared to the case of the area corresponding to the second block 702.

FIG. 8 illustrates a synthesized image acquired through a process from description of FIG. 4 to description of FIG. 7.

Specifically, the processor 130 may acquire a 12-bit original image as shown in FIG. 4 through the image sensor 110, and based on the acquired original image, and acquire an 8-bit MSB side image as shown in FIG. 5A and an 8-bit LSB side image as shown in FIG. 5B.

Further, the processor 130 may acquire a grayscale image from each of the acquired MSB side image and LSB side image, block each pixel included in the acquired grayscale image, and also identify information on the shapes of objects included in the MSB side image and the LSB side image for each block by performing edge detection.

Also, the processor 130 may acquire a synthesized weight for each block with respect to the MSB side image and the LSB side image based on the information identified for each block. In addition, the processor 130 may acquire a synthesized image as illustrated in FIG. 8 based on the identified synthesized weight for each block.

As illustrated in FIG. 8, the synthesized image acquired according to the above-described process may have high visibility for a subject included in the entire area of the image. In addition, since the synthesized image as shown in FIG. 8 is acquired based on one original image acquired through the image sensor 110, the problem of motion artifacts pointed out as a limitation of the prior art may be solved according to the disclosure.

Figure 9A:
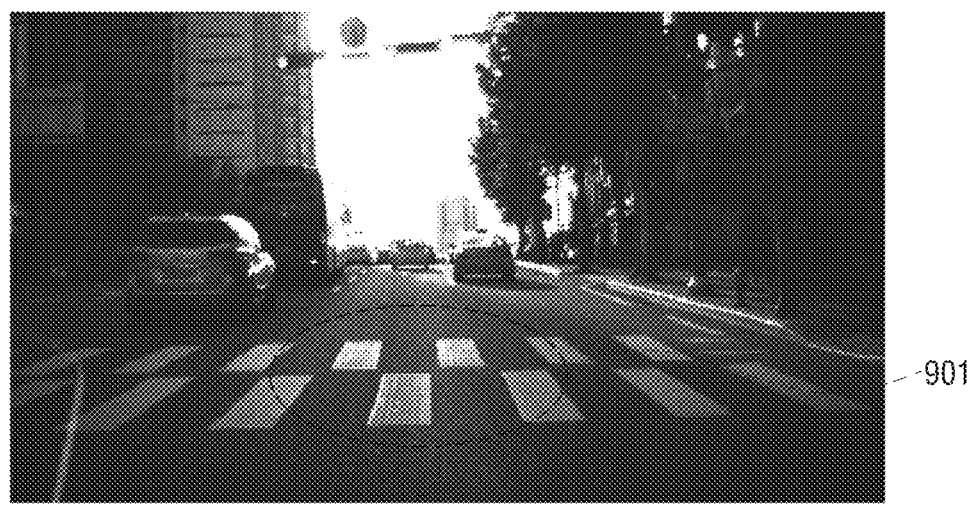
FIGS. 9A to 9C are views exemplarily showing another plurality of sub images according to an embodiment.
Figure 9B:
Figure 9C:

FIGS. 9A to 9C are views exemplarily illustrating another plurality of sub images according to an exemplary embodiment of the disclosure.

Like the images illustrated in FIGS. 5A and 5B, the images illustrated in FIGS. 9A to 9C correspond to 8-bit sub images acquired from the same 12-bit original image. Hereinafter, the image illustrated in FIG. 9A is referred to as a first sub-image, the image illustrated in FIG. 9B is referred to as a second sub-image, and the image illustrated in FIG. 9C is referred to as a third sub-image.

The first sub-image corresponds to an MSB side image, that is, an image acquired based on information from the 1-bit to the 8-bit based on the bit having the largest digit in the 12-bit original image.

The second sub-image corresponds to an image acquired based on information from the 2-bit to the 9-bit, based on the bit having the largest digit in the 12-bit original image.

The third sub-image corresponds to an image acquired based on the information from the 3-bit to the 10-bit based on the bit having the largest digit in the 12-bit original image.

Meanwhile, although not illustrated, the processor 130 may acquire a fourth sub-image acquired based on information from the 4-bit to the 11-bit based on the bit having the largest digit in the 12-bit original image.

In addition, the processor 130 may acquire a fifth sub-image, that is, an LSB side image, which is acquired based on the information from the 5-bit to the 12-bit, based on the bit of the largest digit in the 12-bit original image.

As described above, the processor 130 may acquire the first to fifth sub images of the 8-bit, that is, an 8-bit multi-layer image, from the same 12-bit original image.

Referring to FIGS. 9A to 9C, high visibility may be secured in the first sub-image in the case of a first area 901 including a crosswalk among objects included in a plurality of sub images, high visibility may be secured in the second sub-image in the case of a second area 902, and high visibility may be secured in the third sub-image in the case of a third area 903 including pedestrians and signs, According to an embodiment of the disclosure, the processor 130 may acquire a synthesized image having high visibility in all areas included in the image based on the plurality of sub images as described above.

Specifically, the processor 130 may acquire a 12-bit original image through the image sensor 110, acquire five 8-bit sub images based on the original image, and information on the shapes of objects included in the sub images in each of the five sub images.

Further, the processor 130 may acquire a synthesized weight for each area of at least two sub images among the plurality of sub images based on the identified information as above, and acquire a synthesized image based on the acquired synthesized weight for each area.

In other words, in the description of FIGS. 4 to 7, an exemplary embodiment of acquiring two sub images, that is, the MSB side image and the LSB side image from the original image, has been described, but as described in the description of FIGS. 9A to 9C, a synthesized image may be acquired based on at least two sub images among the five 8-bit sub images acquired from the 12-bit original image.

Meanwhile, as shown in FIGS. 9A to 9B, since the area with high visibility for the object included in the image for each sub-image is different, as the number of sub images that are the basis of the synthesis increases, the visibility of overall synthesized image may be higher.

However, depending on lighting environment, overall visibility of the synthesized image may not be as high as the number of sub images that are the basis of the synthesis increases. Accordingly, in various embodiments of the disclosure, the number of sub images that are the basis for synthesis should be determined by taking into account various lighting environments and an increase in image processing speed according to an increase in the number of sub images.

Figure 10:
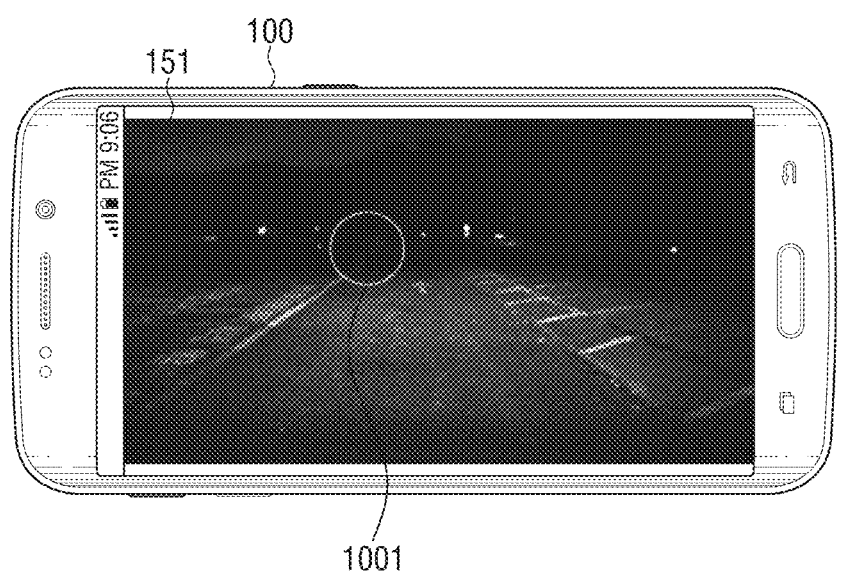
FIG. 10 is a view illustrating input of a user command for selecting at least one of a plurality of areas included in an original image according to an embodiment.

FIG. 10 is a view illustrating an input of a user command for selecting at least one of a plurality of areas included in an original image, according to an embodiment of the disclosure.

As described above, when the original image is acquired through the image sensor 110, the processor 130 may control the display 151 to display the acquired original image.

In addition, a user command for selecting at least one area 1001 from among a plurality of areas included in the original image displayed on the display 151 may be input through the user interface unit 170. Here, the at least one area 1001 selected by the user may correspond to an area where the user desires to secure visibility.

When the user command for selecting at least one area 1001 from among the plurality of areas included in the original image is input, the processor 130 may acquire a synthesized weight for each area with respect to at least two of the sub images among the plurality of sub images based on information on the shapes of objects included in the selected at least one area 1001.

Specifically, the processor 130 may assign a higher synthesized weight to a sub image having a larger amount of information on the shapes of objects included in at least one area 1001 selected by the user, compared to other sub images. Accordingly, the processor 130 may acquire a synthesized image capable of securing higher visibility for the area selected by the user command.

Meanwhile, the user command may be input through a user's touch interaction with a touch screen. In this case, the at least one area 1001 selected by the user command may be an area within a predetermined radius from a point where the user's touch interaction is input, or an area including a plurality of pixels within a predetermined horizontal length and a predetermined vertical length at the point where the user's touch interaction is input.

In the above, the case where the user command is input through the user's touch interaction has been exemplified, but the user command may be input in various ways through various user interface units 170.

In the above, the case where the original image is displayed on the display 151 and the user command for selecting at least one of the plurality of areas included in the original image is input through the user interface unit 170 has been exemplified. However according to another embodiment of the disclosure, the plurality of sub images acquired from the original image are displayed on the display 151, and the user command that selects at least one of the plurality of areas included in at least one sub image among the plurality of sub images may be input through the user interface unit 170.

In this case, when the user command for selecting at least one of the plurality of areas included in at least one of the plurality of sub images is input through the user interface unit 170, the processor 130 may acquire a synthesized weight for each area with respect to at least two sub images among the plurality of sub images.

According to an embodiment of the disclosure as described above, since it is possible to acquire a synthesized image by assigning a high synthesized weight of a sub-image capable of securing high visibility to the area selected by the user command, the visibility of the user's desired area may be further improved.

Figure 11:
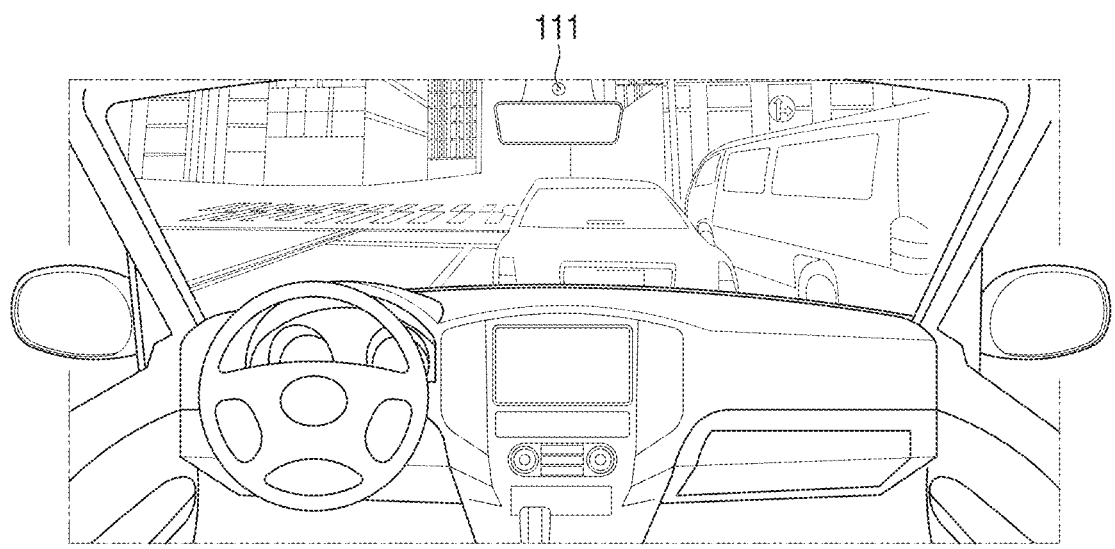
FIG. 11 is a view illustrating an embodiment in which an electronic apparatus according to the disclosure is implemented as a part of a vehicle.

FIG. 11 is a view illustrating an embodiment in which an electronic apparatus according to the disclosure is implemented as a part of a vehicle.

The electronic apparatus according to the disclosure may be implemented as an independent electronic apparatus such as a camera, a smartphone, or the like, and may be implemented as a part of a vehicle, a robot, or the like.

In particular, as illustrated in FIG. 11, the electronic apparatus according to the disclosure may be implemented as a camera 111 that is a part of a vehicle. The vehicle may be an autonomous vehicle. In addition, the camera 111 may be implemented in a form coupled to a rearview mirror inside the vehicle to recognize an object appearing in front of the vehicle while driving. Meanwhile, the camera 111 may include the image sensor 110, the memory 120, and the processor 130 as described above.

Specifically, according to an embodiment of the disclosure, the processor 130 may acquire an original image including an object appearing in front of the vehicle through the image sensor 110.

The processor 130 may acquire a plurality of sub images having a 2-bit number smaller than the 1-bit number for each pixel, based on the original image having the 1-bit number for each pixel.

In addition, the processor 130 may identify information on the shapes of objects included in the plurality of sub images from each of the plurality of sub images, acquire, based on the identified information, a synthesized weight for each area for at least two sub images among the plurality of sub images, and acquire a synthesized image based on the synthesized weight for each of the acquired area.

In addition, various embodiments of the disclosure as described above with reference to FIGS. 1 to 10 may be similarly applied even when the electronic apparatus according to the disclosure is implemented as a part of a vehicle.

As described above, when the electronic apparatus according to the disclosure is implemented as a part of a vehicle, especially an autonomous vehicle, objects appearing in front of a vehicle such as lanes, pedestrians, vehicles, or the like even in various driving environments such as nighttime, bad weather, backlight, or the like may be smoothly recognized, and thus driving stability of the vehicle may be improved.

FIG. 12 is a flowchart schematically illustrating a method of controlling an electronic apparatus according to an embodiment of the disclosure.

According to an embodiment of the disclosure, the electronic apparatus may acquire an original image having a 1-bit number for each pixel through the image sensor 110 (S1201).

Meanwhile, when the original image is acquired, a plurality of sub images having a 2-bit number smaller than the 1-bit number for each pixel may be acquired based on the original image (S1202). The plurality of sub images may include a most significant bit (MSB) side image and a least significant bit (LSB) side image acquired based on the original image.

When the plurality of sub images are acquired, information on the shapes of objects included in the plurality of sub images may be identified from each of the plurality of sub images (S1203). The identification of information may be performed based on a result of edge detection, a histogram of oriented gradient (HOG) value, or the like.

When information on the shapes of objects included in the plurality of sub images is identified, a synthesized weight for each area of at least two sub images among the plurality of sub images may be acquired based on the identified information (S1204).

Meanwhile, the method of controlling the electronic apparatus according to an embodiment of the disclosure may further include displaying the acquired original image when the original image is acquired through the image sensor.

When a user command for selecting at least one of the plurality of areas included in the displayed original image is input, a synthesized weight for each area of at least two sub images of the plurality of sub images the plurality of sub images may be acquired based on the information on the shapes of objects included in at least one area selected among the plurality of sub images.

Meanwhile, when the synthesized weight for each area of at least two sub images among the plurality of sub images is acquired, the synthesized image may be acquired based on the acquired synthesized weight for each area (S1205).

FIG. 13 is a detailed flowchart illustrating a method of controlling an electronic apparatus according to an embodiment of the disclosure.

According to an embodiment of the disclosure, when a 12-bit original image is acquired (S1301), an MSB side image and an LSB side image of an 8-bit may be acquired based on the 12-bit original image (S1302).

When the MSB side image and the LSB side image are acquired, a grayscale image for each of the acquired MSB side and LSB side images may be acquired (S1303). In other words, it may reduce the amount of calculation of image processing by converting the MSB side image and the LSB side image acquired as a color image into the grayscale image.

When the grayscale image is acquired, each pixel included in the acquired grayscale image may be blocked (S1304). For example, the efficiency and speed of image processing may be improved by blocking 1280×720 pixels included in each of the MSB side image and the LSB side image of the grayscale to be included in 32×18 blocks.

When each pixel is blocked, information on the shapes of objects included in the MSB side image and the LSB side image may be identified for each block (S1305). The identification of each block information may be performed based on various methods, such as edge detection, histogram feature detection, corner detection, or the like.

When information on the shapes of objects for each block is identified, a synthesized weight for each block for the MSB side image and the LSB side image may be acquired based on the identified information (S1306). Specifically, a higher synthesized weight may be assigned to an image capable of securing high visibility for a specific area of the MSB side image or the LSB side image in acquiring the synthesized weight for each block.

When the synthesized weight for each block is acquired, a synthesis image may be acquired based on the acquired synthesized weight for each block (S1307). In other words, it is possible to acquire a synthesized image having high visibility for all areas included in the image compared to the original image.

The method of controlling an electronic device according to the above-described various exemplary embodiments may be realized as a program and provided in the user terminal device. In particular, the program including a method for controlling a display apparatus according to exemplary embodiments may be stored in a non-transitory computer readable medium and provided therein.

The non-transitory computer readable recording medium refers to a medium that stores data and that can be read by devices. In detail, the above-described various applications or programs may be stored in the non-transitory computer readable medium, for example, a compact disc (CD), a digital versatile disc (DVD), a hard disc, a Blu-ray disc, a universal serial bus (USB), a memory card, a read only memory (ROM), and the like, and may be provided.

According to various embodiments of the disclosure as described above, a plurality of sub images having a smaller bit number than an original image are acquired from the original image, and a synthesized image capable of securing visibility for all included areas may be acquired based on information on the shapes of objects included in the plurality of sub images. In addition, since the synthesized image according to the disclosure is acquired based on one original image, the problem of motion artifacts, which is pointed out as a limitation of the prior art, may be solved according to the disclosure.

The foregoing exemplary embodiments and advantages are merely exemplary and are not to be construed as limiting the present disclosure. The present teaching may be readily applied to other types of apparatuses. Also, the description of the exemplary embodiments of the present disclosure is intended to be illustrative, and not to limit the scope of the claims, and many alternatives, modifications, and variations will be apparent to those skilled in the art.

What is claimed is:

1. An electronic apparatus comprising:
an image sensor;
a display;
a user interface unit;
a memory including at least one command; and
a processor configured to control the electronic apparatus being coupled to the image sensor and the memory,
wherein the processor is further configured to:
acquire an original image having a first bit number value for each pixel through the image sensor, the original image is acquired without using a plurality of images having different exposures,
based on the original image being acquired through the image sensor, control the display to display the acquired original image,
acquire a plurality of sub images having a second bit number value smaller than the first bit number value for each pixel based on the original image,
identify an amount of information on shapes of objects included in the plurality of sub images from each of the plurality of sub images, based on a user command for selecting at least one area among a plurality of areas included in the displayed original image being input through the user interface unit, acquire a synthesized weight for each area with respect to two sub images among the plurality of sub images based on the identified amount of the information by assigning a higher synthesized weight to a sub image having a larger amount of information on the shapes of objects included in at least one area selected by a user, compared to other sub images from the plurality of sub images, and acquire a synthesized image based on the synthesized weight for each of the acquired synthesized weight for each area.

2. The electronic apparatus of claim 1, wherein the plurality of sub images include a most significant (MSB) side image and a least significant bit (LSB) side image acquired based on the original image.

3. The electronic apparatus of claim 2, wherein the processor is configured to acquire a grayscale image with respect to each of the plurality of sub images, block each pixel included in the acquired grayscale image, and identify information on the shapes of objects included in the plurality of sub images for each block according to the blocking.

4. The electronic apparatus of claim 3, wherein the processor is further configured to acquire a synthesized weight for each block with respect to at least two sub images among the plurality of sub images based on the information identified for each block.

5. The electronic apparatus of claim 1, wherein the processor is further configured to identify information on the shapes of objects included in the plurality of sub images through an edge detection.

6. The electronic apparatus of claim 1, wherein the processor is further configured to identify the information on the shapes of objects included in the plurality of sub images based on a histogram of oriented gradient (HOG) value.

7. A method of controlling an electronic apparatus comprising:

acquiring an original image having a first bit number value for each pixel through an image sensor;

acquiring a plurality of sub images having a second bit number value smaller than the first bit number value for each pixel based on the original image, the original image is acquired without using a plurality of images having different exposures;

based on the original image being acquired through the image sensor, displaying the acquired original image;

identifying an amount of information on shapes of objects included in the plurality of sub images from each of the plurality of sub images;

based on a user command for selecting at least one area among a plurality of areas included in the displayed original image being input through an user interface unit, acquiring a synthesized weight for each area with respect to two sub images among the plurality of sub images based on the identified amount of the information by assigning a higher synthesized weight to a sub image having a larger amount of information on the shapes of objects included in at least one area selected by a user, compared to other sub images from the plurality of sub images; and acquiring a synthesized image based on the synthesized weight for each of the acquired synthesized weight for each area.

8. The method of claim 7, wherein the plurality of sub images include a most significant (MSB) side image and a least significant bit (LSB) side image acquired based on the original image.

9. The method of claim 8, further comprising:

acquiring a grayscale image with respect to each of the plurality of sub images; and blocking each pixel included in the acquired grayscale image, and wherein the identifying the information includes identifying information on the shapes of objects included in the plurality of sub images for each block according to the blocking.

10. The method of claim 9, wherein the acquiring of the synthesized weight for each of the areas includes acquiring a synthesized weight for each block with respect to at least two sub images among the plurality of sub images based on the information identified for each block.

11. The method of claim 7, wherein the identifying of the information includes identifying information on the shapes of objects included in the plurality of sub images through an edge detection.

12. The method of claim 7, wherein the identifying of the information includes identifying the information on the shapes of objects included in the plurality of sub images based on a histogram of oriented gradient (HOG) value.

13. The method of claim 7, further comprising:

based on the original image being acquired through the image sensor, displaying the acquired original image, wherein the acquiring of the synthesized weight for each of the areas includes, based on a user command for selecting at least one area among a plurality of areas included in the displayed original image being input and based on the information on the shapes of objects included in at least one of the selected areas among the plurality of sub images, acquiring a synthesized weight for each area with respect to two sub images among the plurality of sub images.

14. The electronic apparatus of claim 1, wherein the processor is further configured to assign the synthesized weight of a first sub image to twice the synthesized weight of a second sub image.

* * * * *